(12) United States Patent
Kwon et al.

(10) Patent No.: US 11,816,520 B2
(45) Date of Patent: Nov. 14, 2023

(54) IOT-BASED CABLE USED IN CABLE MANAGEMENT SYSTEM (71) Applicant: LS CABLE & SYSTEM LTD., Anyang-si (KR)

(72) Inventors: Jung Ji Kwon, Gumi-si (KR); Young Ho Kim, Gumi-si (KR); Jung Nyun Kim, Gumi-si (KR); Seok Hyun Nam, Gumi-si (KR); Won Young Kim, Seoul (KR); Seon U. Bang, Seoul (KR)

(73) Assignee: LS CABLE & SYSTEM LTD., Anyang-si (KR)

( * ) Notice: Subject to any disclaimer, the term of this patent is extended or adjusted under 35 U.S.C. 154(b) by 44 days.

(21) Appl. No.: 17/625,536

(22) PCT Filed: Jul. 9, 2020

(86) PCT No.: PCT/KR2020/008977
§ 371 (c)(1),
(2) Date: Jan. 7, 2022

(87) PCT Pub. No.: WO2021/006647
PCT Pub. Date: Jan. 14, 2021

(65) Prior Publication Data
US 2022/0277181 A1 Sep. 1, 2022

(30) Foreign Application Priority Data

Jul. 10, 2019 (KR) .................. 10-2019-0083405
Jul. 9, 2020 (KR) .................. 10-2020-0084400

(51) Int. Cl.
*G06K 19/06* (2006.01)
*H01B 7/36* (2006.01)
*G06V 10/10* (2022.01)

(52) U.S. Cl.
CPC ....... *G06K 19/06046* (2013.01); *G06V 10/10* (2022.01); *H01B 7/36* (2013.01); *G06K 2019/06253* (2013.01)

(58) Field of Classification Search
CPC .... G06K 19/06046; G06K 7/00; G06V 10/10; G06V 10/00; G06V 30/00; H01B 7/36; G06F 18/00
(Continued)

(56) References Cited

U.S. PATENT DOCUMENTS

| | | | | |
|---|---|---|---|---|
| 8,912,889 B2* | 12/2014 | Sarchi | ................... | D07B 1/145 |
| | | | | 340/572.1 |
| 2002/0113125 A1* | 8/2002 | Schuessler | ............. | G06K 1/121 |
| | | | | 235/462.1 |
| 2011/0025468 A1* | 2/2011 | Longhurst | .............. | G02B 6/447 |
| | | | | 385/100 |

FOREIGN PATENT DOCUMENTS

| | | | | |
|---|---|---|---|---|
| CN | 105723268 A * | 6/2016 | ............... | G02B 6/24 |
| FR | 3002171 A1 * | 8/2014 | ........... | B23K 26/083 |

(Continued)

OTHER PUBLICATIONS

International Search Report for related International Application No. PCT/KR2020/008977; report dated Jan. 14, 2021; (6 pages).

(Continued)

*Primary Examiner* — Edwyn Labaze
(74) *Attorney, Agent, or Firm* — K&L Gates LLP (57) ABSTRACT

A cable comprises: a cable core; and a cable sheath layer formed on the outside of the cable core, wherein the cable sheath layer has, on the outer surface thereof, a pattern corresponding to a binary code. A recognition rate is improved, and a problem of the productivity of the cable being reduced may be prevented by adjusting the widths of the pattern, corresponding to the binary code printed on the cable, in the vertical direction and the horizontal direction, (Continued)

and a plurality of patterns corresponding to the binary code printed on the cable are provided to prevent, even when the cable is buried in the ground or contacts a facility and a pattern corresponding to some binary patterns is not exposed, a pattern corresponding to the other binary patterns from being exposed and unrecognizable.

10 Claims, 11 Drawing Sheets

(58) Field of Classification Search
USPC .......................... 235/454, 439, 435, 375, 487
See application file for complete search history.

(56) References Cited

FOREIGN PATENT DOCUMENTS

| | | |
|---|---|---|
| JP | 06043932 U | 6/1994 |
| JP | 09184949 A | 7/1997 |
| JP | 2004266993 A | 9/2004 |
| JP | 2017200332 A | 11/2017 |
| WO | 2004015720 A1 | 2/2004 |

OTHER PUBLICATIONS

Written Opinion for related International Application No. PCT/KR2020/008977; report dated Jan. 14, 2021; (4 pages).

* cited by examiner

IOT-BASED CABLE USED IN CABLE MANAGEMENT SYSTEM

CROSS-REFERENCE TO RELATED APPLICATIONS

This application is the National Stage filing under 35 U.S.C. 371 of International Application No. PCT/KR2020/008977, filed on Jul. 9, 2020, which claims the benefit of earlier filing date of and right of priority to Korean Application No. 10-2019-0083405 filed on Jul. 10, 2019 and Korean Application No., 10-2020-0084400, filed on Jul. 9, 2020, the contents of which are all hereby incorporated by reference herein in their entirety.

FIELD

The present disclosure relates to an IoT-based cable used in a cable management system and, more particularly, to an IoT-based cable used in a cable management system that facilitates management of cable state and life.

BACKGROUND

As the 4th industrial revolution accelerates, major IT companies such as Google, Microsoft, Apple, Tesla, and Softbank are also spurring the 4th industrial revolution. These IT companies are also expanding their business in the power market. With this effort, digital technology is also spreading into the power market, where analog technology dominates.

As a result, digital technology is applied to power generation, transmission, and distribution to diagnose the condition of turbines and generators, develop parts management solutions, determine cable system failures, determine replacement grades, develop sensor-embedded junction boxes, analyze gas-in-oil patterns in transformers, and develop artificial intelligence-based substation optimal recovery systems. In particular, technologies for visually checking the operation and state of cables are under development, which provide information on product quality, state diagnosis, and replacement cycle.

However, these technologies attach or insert a sensor or a recognizable element such as an RF-ID chip into a cable or attach a sticker printed with a recognizable pattern such as a QR code on the outside of the cable. Among these technologies, a method of attaching a sensor or a recognizable element to the inside of the cable has a problem in that the cable manufacturing cost is high, and the cable structure and electrical stability are affected. Also, in the case of the sticker attachment method, a sticker is easily damaged due to scratches in a distribution/installation/management process, which lowers the recognition rate and makes it impossible to attach a sticker with a pattern corresponding to a different binary code for each cable length unit. Therefore, there is a problem in that it is impossible to input different information when a cable wound on a single drum is cut into length units and sold or laid in another place during the distribution/installation process.

SUMMARY

The present disclosure has been made to solve the technical problem above and intends to provide an IoT-based cable used for a cable management system that facilitates cable management by checking cable state on the spot.

To achieve the object, a cable according to one embodiment of the present disclosure comprises a cable core and a cable sheath layer formed on the outside of the cable core, wherein the cable sheath layer has, on the outer surface thereof, a pattern corresponding to a binary code.

According to one embodiment of the present disclosure, the cable core may comprise a conductive layer and an insulating layer surrounding the conductive layer.

According to one embodiment of the present disclosure, a plurality of patterns corresponding to the binary code may be provided, and central angles formed by the patterns corresponding to the binary codes in the cross-sectional view may be the same.

According to one embodiment of the present disclosure, the length of a pattern corresponding to the binary code in the vertical direction may be expressed as the length of a circular arc in the cross-sectional view, and the magnitude of a central angle corresponding to the length of the circular arc may range from 5 degrees to 15 degrees.

According to one embodiment of the present disclosure, the length of a pattern corresponding to the binary code in the vertical direction may be expressed as the length of a circular arc in the cross-sectional view, and the length of the circular arc may be longer than 4 mm and shorter than the length defined by the following equation.

$$h = 2\pi r \times 15/360.$$

(In the equation above, h represents the length of a circular arc, and r represents the radius of a cable in the cross-sectional view.)

According to one embodiment of the present disclosure, the ratio of the widths of a pattern corresponding to the binary code in the vertical and horizontal directions may be 1:2 to 1:4.

The present disclosure prints a pattern corresponding to a binary code on a cable and allows users to directly check desired information using a pattern recognition device and platform corresponding to the binary code in the manufacturing, distribution/installation, and on-site use stage.

Also, when it is necessary to change cable-related information, the changed information may be additionally input, or the input information may be modified to facilitate cable management.

Also, information loss does not occur since the information generated during a cable management process is input in real-time. Therefore, accidents due to cable misconnection and failure to detect a live wire may be prevented.

Also, a recognition rate may be improved by adjusting the widths of a pattern corresponding to a binary code printed on a cable in the vertical and horizontal directions, and a problem of the productivity of the cable being reduced may be prevented.

Also, a plurality of patterns corresponding to a binary code printed on a cable are provided. Thus, even when the cable is buried in the ground or contacts a facility, and a pattern corresponding to some binary patterns is not exposed, a pattern corresponding to the other binary patterns is still exposed to prevent the pattern from being unrecognized.

DETAILED DESCRIPTION

Since the present disclosure may be modified in various ways and may provide various embodiments, specific embodiments will be described in detail in the present document. However, it should be understood that the specific embodiments are not intended to limit the gist of the present disclosure; rather, it should be understood that the specific embodiments include all of the modifications, equivalents, or substitutes belonging to the technical principles and scope of the present disclosure. Regarding the description of the drawings, similar constituting elements are given similar reference symbols. Terms such as "first" and "second" may be used to describe various constituting elements, but the constituting elements should not be limited by the terms.

Those terms are used only for the purpose of distinguishing one constituting element from the others. Terms used in this document are intended only for describing a specific embodiment and are not intended to limit the technical scope of the present disclosure. A singular expression should be understood to indicate a plural expression unless otherwise explicitly stated.

The term of "include" or "make up" is used to indicate existence of an embodied feature, number, step, operation, element, component, or a combination thereof and should not be understood to preclude the existence or possibility of adding one or more other features, numbers, steps, operations, elements, components, or a combination thereof.

Unless defined otherwise, all the terms used in the present disclosure, including technical or scientific terms, provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

In what follows, preferred embodiments of the present disclosure will be described in detail with reference to appended drawings.

Figure 1:
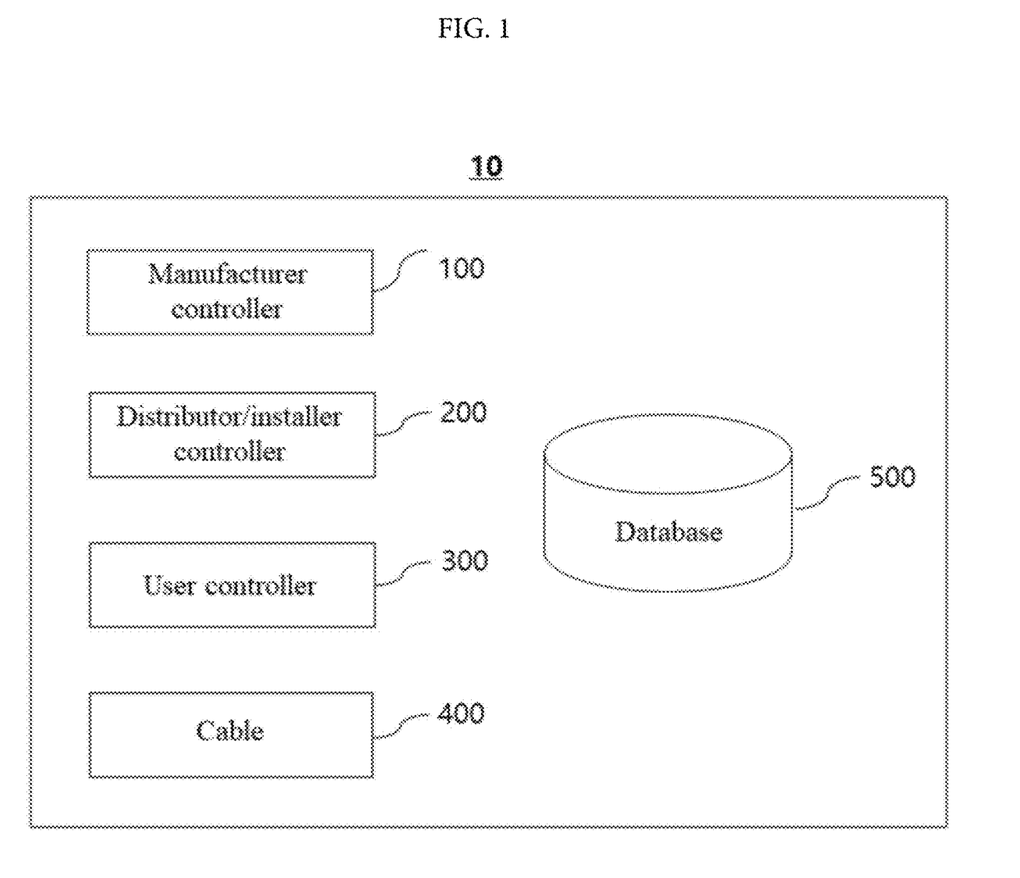
FIG. 1 is a block diagram illustrating a cable management system according to one embodiment of the present disclosure.

FIG. 1 is a block diagram illustrating a cable management system according to one embodiment of the present disclosure.

Referring to FIG. 1, an IoT-based cable management system 10 according to one embodiment of the present disclosure includes a manufacturer controller 100, a distributer/installer controller 200, a user controller 300, a cable 400, and a database 500.

The manufacturer controller 100 may manage data generated in the manufacturing process of the cable. The manufacturer controller 100 may input information such as product specifications (for example, structure, voltage, and capacity) of a produced cable, manufacturing date, lot number, product report, contact information for a salesperson in charge, and precautions and notifications when using the product. The information input by the manufacturer controller 100 is reconfigured into a pattern corresponding to a binary code representing the information, and patterns corresponding to the binary code may be printed on the surface of the cable 400. The data included in the patterns corresponding to the binary code may be stored in the database 500, and the manufacturer controller 100 may modify the data included in the patterns corresponding to the binary code when there is a change in the data.

The distributor/installer controller 200 may manage data generated during the process of distributing and laying cables. The distributor/installer controller 200 may input information such as transportation information, product abnormality, system diagram (cable length and the like), completion inspection results, and particular matters on a laying process. The information input by the distributor/installer controller 200 is reconfigured into a pattern corresponding to a binary code representing the information, and patterns corresponding to the binary code may be printed on the surface of the cable 400. The data included in the patterns corresponding to the binary code may be stored in the database 500, and the distributor/installer controller 200 may modify the data included in the patterns corresponding to the binary code when there is a change in the data.

The user controller 300 may manage installed cables and manage generated data on the spot. The user controller 300 may input information such as live wire or disconnection check results for cable management and maintenance, a systematic diagram, an emergency contact network of cable managers, and particular matters during operation of installed cables such as cable management history, cable line accidents and recovery history. The information input by the user controller 300 is reconfigured into a dot pattern according to a binary code representing the information, and patterns corresponding to the binary code may be printed on the surface of the cable 400. The data included in the patterns corresponding to the binary code may be stored in the database 500, and the user controller 300 may modify the data included in the patterns corresponding to the binary code when there is a change in the data.

A pattern corresponding to a binary code may be printed on the surface of the cable 400 during the manufacturing process of the cable 400. The information entered by the manufacturer controller 100 during the manufacturing process may be reconfigured into dot patterns according to the corresponding binary codes and printed on the surface of the cable 400. Afterwards, the distributor/installer controller 200 may enter the information generated during the distribution and installation of cables, and the user controller 300 may add information while the cables are used on the spot after the installation.

The database 500 may receive and store information input and updated by the manufacturer controller 100, the distributor/installer controller 200, and the user controller 300. The information stored in the database 500 may be managed in the form of big data, and the data in the form of big data may be used to diagnose the cable's condition.

Figure 2:
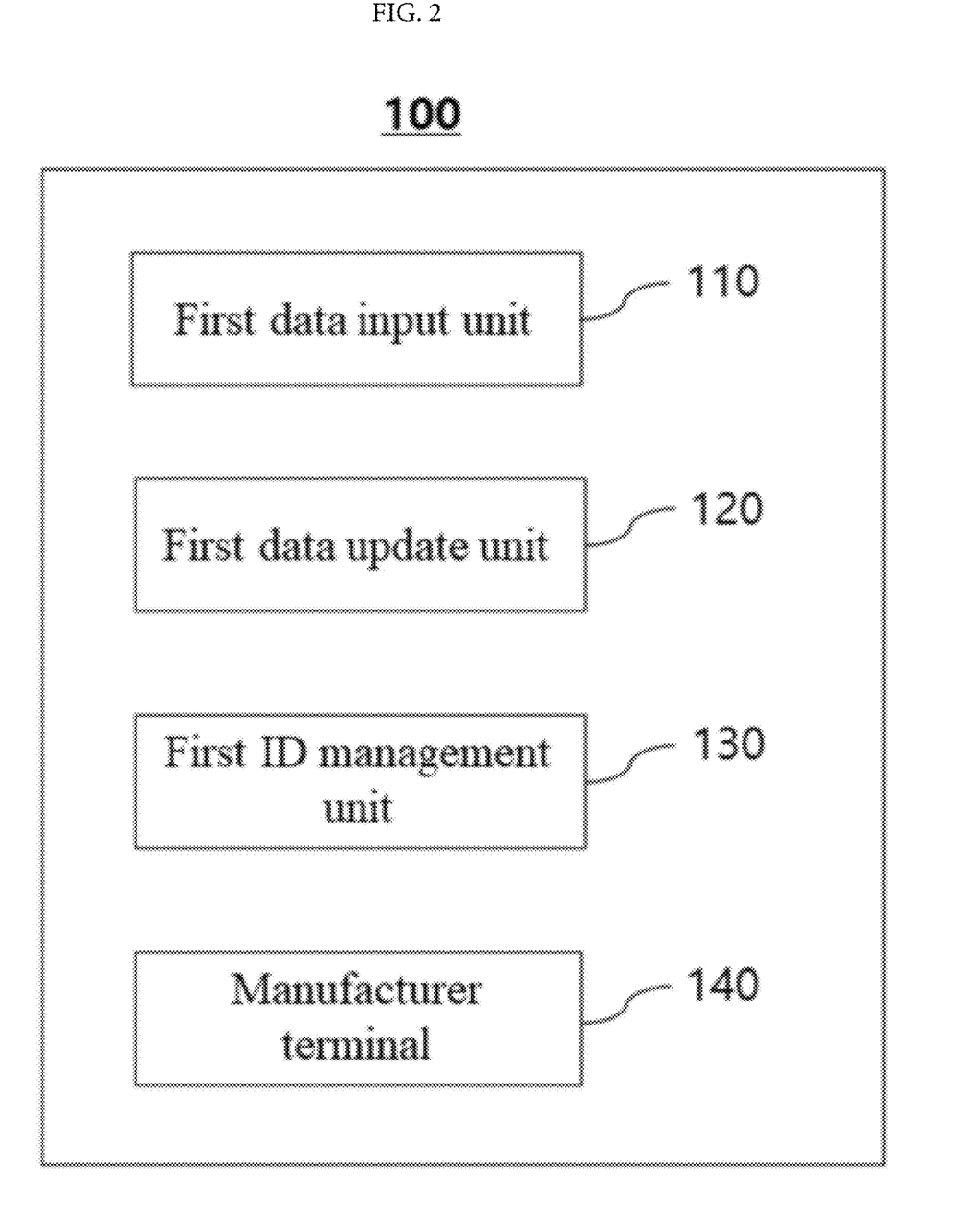
FIG. 2 is a block diagram illustrating a manufacturer controller of a cable management system according to one embodiment of the present disclosure.

FIG. 2 is a block diagram illustrating a manufacturer controller of a cable management system according to one embodiment of the present disclosure.

Referring to FIG. 2, the manufacturer controller 100 of the IoT-based cable management system 10 according to one embodiment of the present disclosure may include a first data input unit 110, a first data update unit 120, a first ID management unit 130, and a manufacturer terminal 140.

The first data input unit 110 may input information generated during a manufacturing process. For example, information initially generated during a manufacturing process may include product specifications (for example, structure, voltage, and capacity) of a produced cable, manufacturing date, lot number, product report, contact information for a salesperson in charge, and precautions and notifications when using the product. Afterwards, when information change is required due to the information entered by the distributor/installer controller 200 and the user controller 300 or when information change is required for a product or personnel during the manufacturing process, additional information may be entered.

The first data update unit 120 may update related data when information is changed after the initial information has been input. For example, when there is a change in product specifications or personnel in charge during a manufacturing process, the first data update unit 120 may receive changed information from the database 500 and update the related data. Also, when distribution and installation information of a product is received, the distributor/installer controller 200 inputs the received information, the input information is delivered to the database 500, and the first data update unit 120 receives the newly input information from the database 500 and updates data accordingly. Also, when information on whether a cable is live/disconnected, cable line accidents and recovery history, and so on is input in the use stage after installation, the user controller 300 inputs the information, the input information is delivered to the database 500, and the first data update unit 120 receives the newly input information from the database 500 and updates data accordingly.

The first ID management unit 130 may manage the ID of the manufacturer controller 100. The first ID management unit 130 may manage the ID of the manufacturer controller 100 through operations such as registering, deleting, and changing the ID. The first ID management unit 130 manages the ID of an employee in charge of inputting information using the manufacturer controller 100, and thereby manages the information input from the other part, namely, the distributor/installer controller 200 and the information input from the user controller 100, separately. Accordingly, it becomes possible to manage the input information for each area.

The manufacturer terminal 140 may recognize a pattern corresponding to the binary code printed on the surface of the cable 400 and read the information included in the pattern corresponding to the binary code. The manufacturer terminal 140 may include a device capable of recognizing a pattern corresponding to the binary code and a platform capable of reading information included in the pattern corresponding to the binary code. Also, the manufacturer terminal 140 may transmit information input to the pattern corresponding to the binary code and updated information to the database 500.

Figure 3:
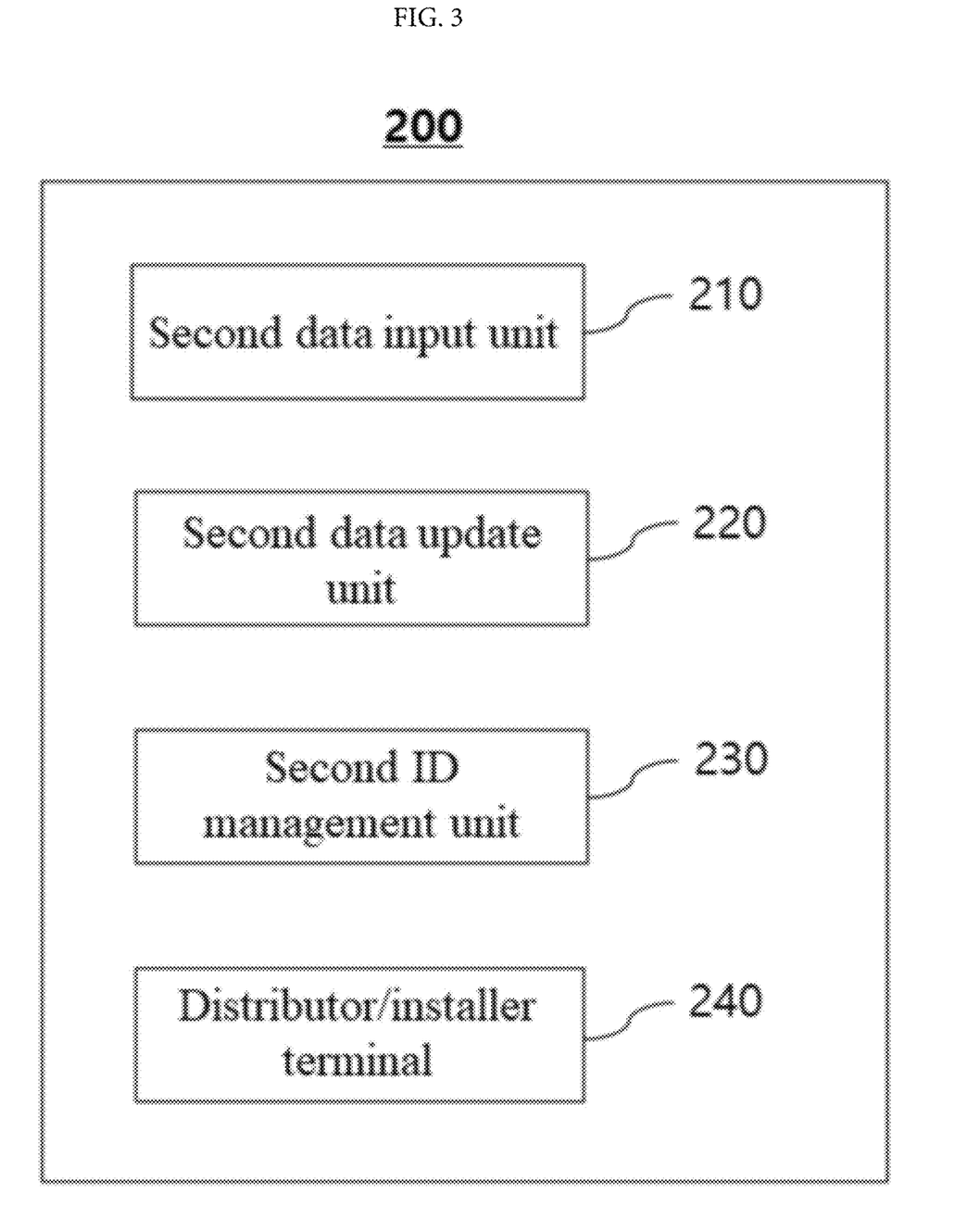
FIG. 3 is a block diagram illustrating a distributor/installer controller of a cable management system according to one embodiment of the present disclosure.

FIG. 3 is a block diagram illustrating a distributor/installer controller of a cable management system according to one embodiment of the present disclosure.

Referring to FIG. 3, the distributor/installer controller 200 of an IoT-based cable management system 10 according to one embodiment of the present disclosure may include a second data input unit 210, a second data update unit 220, a second ID management unit 230, and a distributor/installer terminal 240.

The second data input unit 210 may input the information generated during cable distribution and installation. For example, the information initially generated during the cable distribution and installation processes may include transportation information, product abnormality, system diagram (cable length and the like), completion inspection results, and particular matters on a laying process. Afterward, additional information may be input when the information input by the manufacturer controller 100 and the user controller 300 requires information change or when information change is required for distribution, installation, or personnel in the distribution and installation processes.

The second data update unit 220 may update related data when information changes after the initial input of the information. For example, if there is a change in the distribution route, installation method, installation place, or personnel in charge during distribution and installation processes, the changed information may be reflected to update the information. Also, when a change in the product specifications or personnel in charge of manufacturing is input, the manufacturer controller 100 inputs the change, the input information is delivered to the database 500, and the second data update unit 220 receives the newly input information from the database 500 and updates data accordingly. Also, when information on whether a cable is live/disconnected, cable line accidents and recovery history, and so on is input in the use stage after installation, the user controller 300 inputs the information, the input information is delivered to the database 500, and the second data update unit 220 receives the newly input information from the database 500 and updates data accordingly.

The second ID management unit 230 may manage the ID of the distributor/installer controller 200. The second ID management unit 230 may manage the ID of the distributor/installer controller 200 through operations such as registering, deleting, and changing the ID. The second ID management unit 230 manages the ID of an employee in charge of inputting information using the distributor/installer controller 200, and thereby manages the information input from the other part, namely, the manufacturer controller 100 and the user controller 300, and the information input from the distributor/installer controller 200, separately. Accordingly, it becomes possible to manage the input information for each area.

The distributor/installer terminal 240 may recognize a pattern corresponding to the binary code printed on the surface of the cable 400 and read the information included in the pattern corresponding to the binary code. The distributor/installer terminal 240 may include a device capable of recognizing a pattern corresponding to the binary code and a platform capable of reading information included in the pattern corresponding to the binary code. Also, the distributer/installer terminal 240 may transmit information input to the pattern corresponding to the binary code and updated information to the database 500.

Figure 4:
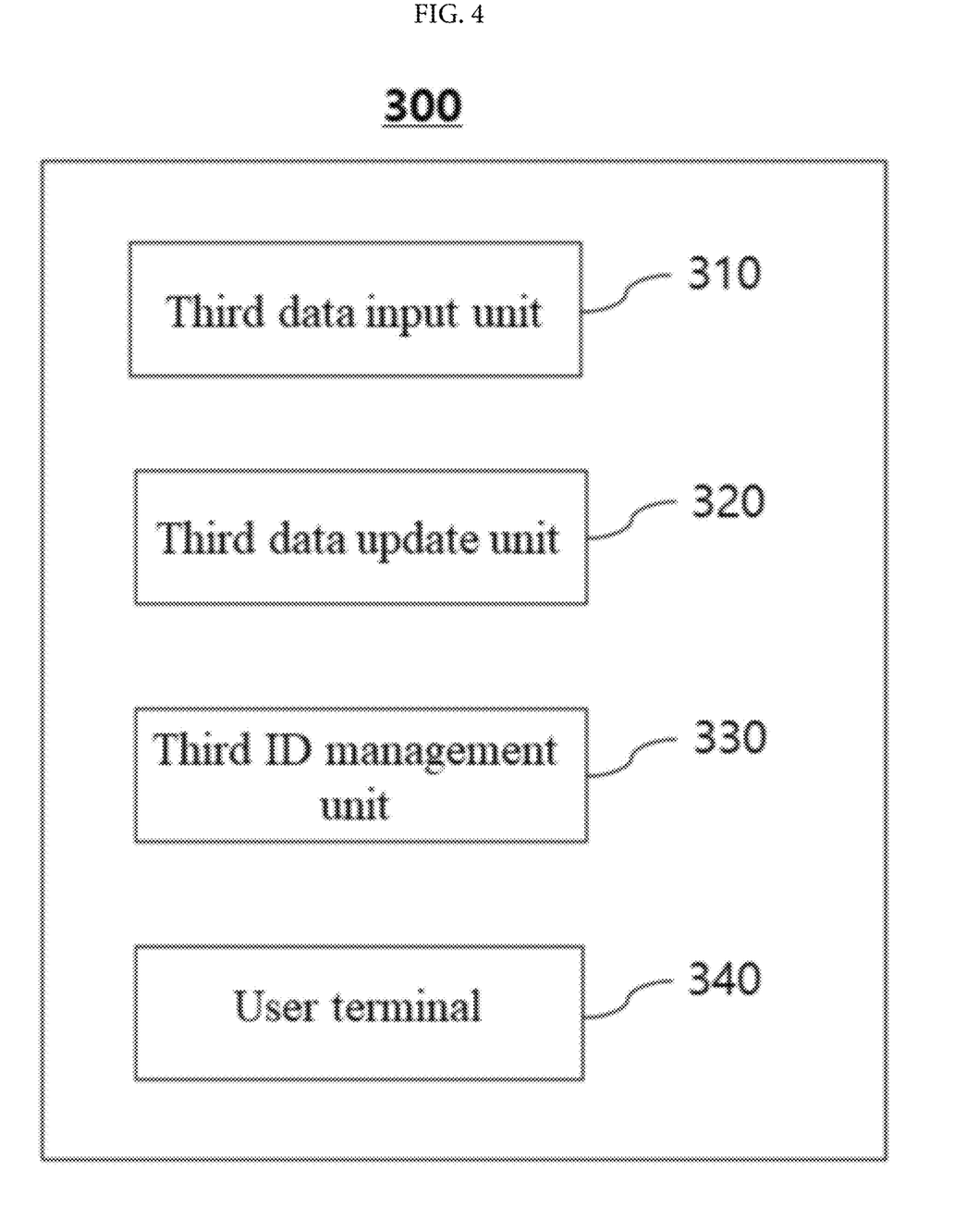
FIG. 4 is a block diagram illustrating a user controller of a cable management system according to one embodiment of the present disclosure.

FIG. 4 is a block diagram illustrating a user controller of a cable management system according to one embodiment of the present disclosure.

Referring to FIG. 4, a user controller 300 of an IoT-based cable management system 10 according to one embodiment of the present disclosure may include a third data input unit 310, a third data update unit 320, a third ID management unit 330, and a user terminal 340.

The third data input unit 310 may input the information generated on the spot where installed cables are used. For example, the information initially generated on the spot where installed cables are used may include live wire or disconnection check results, a systematic diagram, cable specifications, an emergency contact network of cable managers, and particular matters during operation of installed cables such as cable management history, cable line accidents and recovery history. Afterwards, when information change is required due to the information entered by the manufacturer controller 100 and the distributor/installer controller 200 or when information change is required for a situation newly generated on the spot or personnel, additional information may be entered.

The third data update unit 320 may update related data when information changes after the initial input of the information. For example, if there is a change in the distribution route, installation method, installation place, or personnel in charge during distribution and installation processes, the changed information may be reflected to update the information. Also, when a change in the product specifications or personnel in charge of manufacturing is input, the manufacturer controller 100 inputs the change, the input information is delivered to the database 500, and the third data update unit 320 receives the newly input information from the database 500 and updates data accordingly. Also, when information on product distribution and installation is input, the distributor/installer controller 200 inputs the information, the input information is delivered to the database 500, and the third data update unit 320 receives the newly input information from the database 500 and updates data accordingly.

The third ID management unit 330 may manage the ID of the user controller 300. The third ID management unit 330 may manage the ID of the user controller 300 through operations such as registering, deleting, and changing the ID. The third ID management unit 330 manages the ID of an employee in charge of inputting information using the user controller 300, and thereby manages the information input from the other part, namely, the manufacturer controller 100 and the distributor/installer controller 200, and the information input from the user controller 300, separately. Accordingly, it becomes possible to manage the input information for each area.

The user terminal 340 may recognize a pattern corresponding to the binary code printed on the surface of the cable 400 and read the information included in the pattern corresponding to the binary code. The user terminal 340 may include a device capable of recognizing a pattern corresponding to the binary code and a platform capable of reading information included in the pattern corresponding to the binary code. Also, the user terminal 340 may transmit information input to the pattern corresponding to the binary code and updated information to the database 500.

Figure 5:
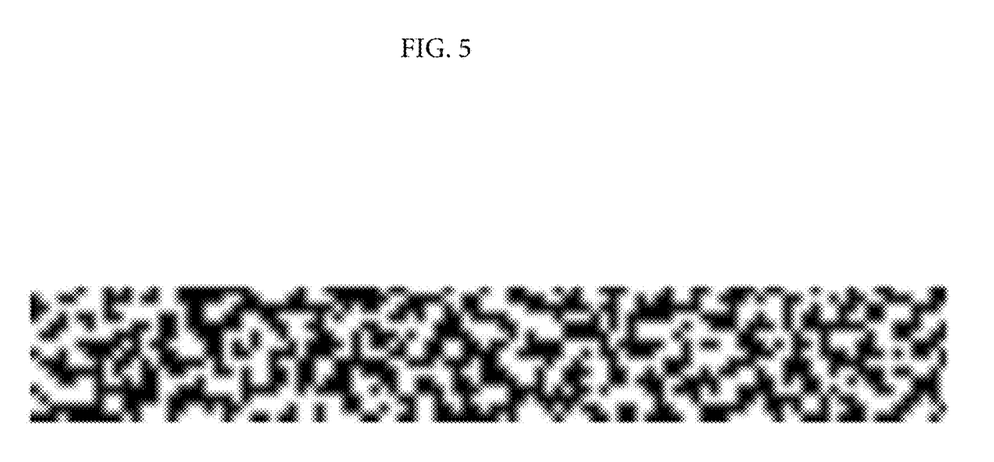
FIG. 5 illustrates a pattern corresponding to a binary code provided on the cable sheath layer of a cable management system according to one embodiment of the present disclosure.
Figure 6:
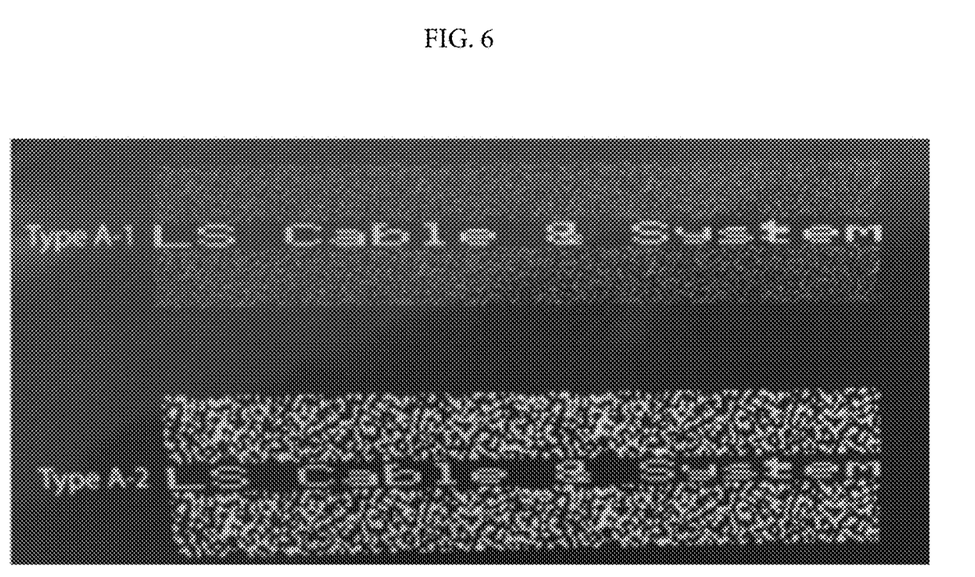
FIG. 6 illustrates a pattern corresponding to a binary code provided on the cable sheath layer of a cable management system according to one embodiment of the present disclosure.
Figure 7:
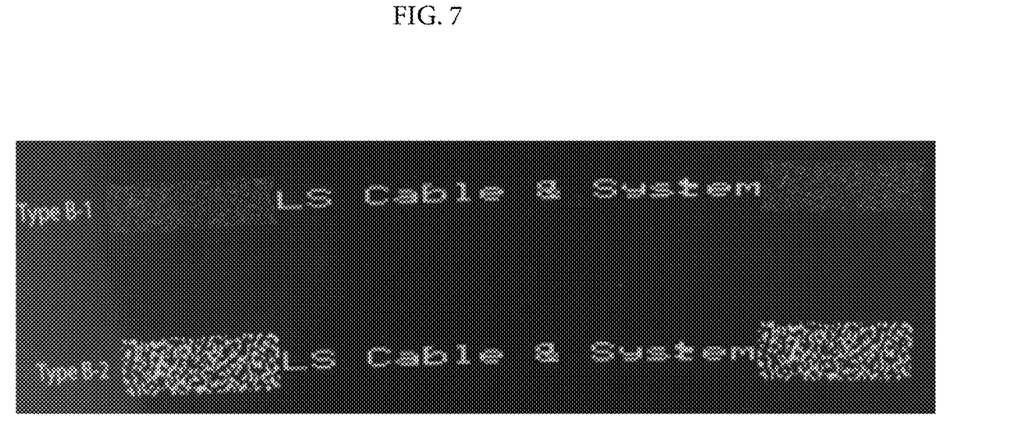
FIG. 7 illustrates a pattern corresponding to a binary code provided on the cable sheath layer of a cable management system according to one embodiment of the present disclosure.
Figure 8:
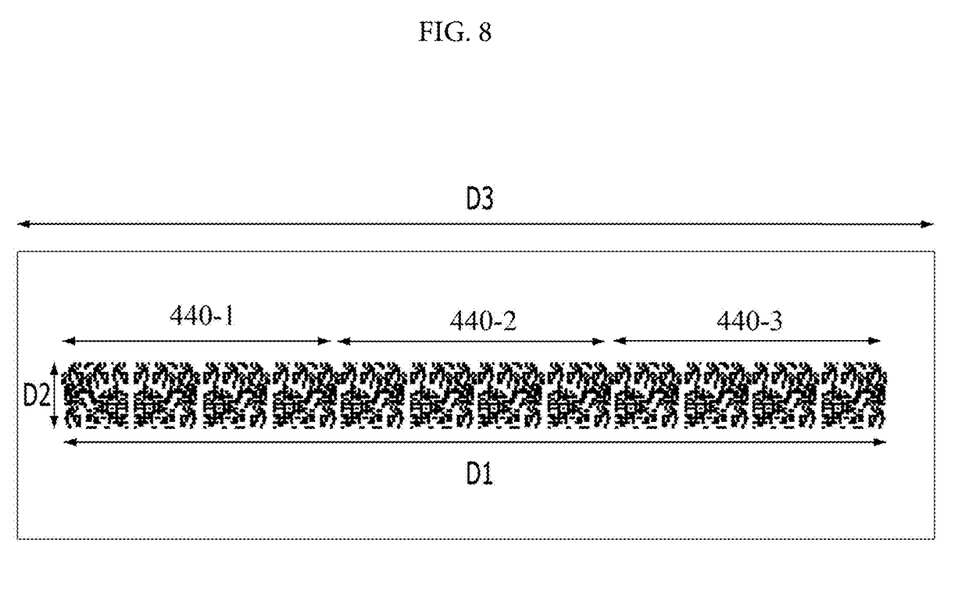
FIG. 8 illustrates a pattern corresponding to a binary code provided on the cable sheath layer of a cable management system according to one embodiment of the present disclosure.

FIG. 5 illustrates a pattern corresponding to a binary code provided on the cable sheath layer of a cable management system according to one embodiment of the present disclosure. FIG. 6 illustrates a pattern corresponding to a binary code provided on the cable sheath layer of a cable management system according to one embodiment of the present disclosure. FIG. 7 illustrates a pattern corresponding to a binary code provided on the cable sheath layer of a cable management system according to one embodiment of the present disclosure. FIG. 8 illustrates a pattern corresponding to a binary code provided on the cable sheath layer of a cable management system according to one embodiment of the present disclosure.

Referring to FIGS. 5 to 8, a pattern corresponding to a binary code provided on a sheath layer of a cable in a cable management system according to one embodiment of the present disclosure may have various forms. For example, the pattern corresponding to the binary code may be a dot pattern, a QR code, or a data matrix.

The pattern corresponding to the binary code provided on the sheath layer of the cable 400 may be printed during the manufacturing process of the cable. The manufacturing process of the cable proceeds according to a continuous manufacturing processing method in which a produced cable is wound around a drum, and after the process of installing the cable sheath layer, a pattern corresponding to a binary code may be printed on the surface of the cable in the longitudinal direction D3 of the cable. Accordingly, the pattern corresponding to the binary code may be printed to have a width in a horizontal direction D1, the longitudinal direction D3 of the cable and a width in a vertical direction D2 perpendicular to the horizontal direction D1.

Therefore, in the continuous manufacturing process, printing a pattern corresponding to the binary code in the horizontal direction D1, which is the cable longitudinal direction D3, is not that limited. However, in the case of a pattern corresponding to a binary code in the vertical direction D2 perpendicular to the horizontal direction D1, the outer diameter of a cable may affect the pattern or the flow in the continuous manufacturing process of the cable.

Also, when the distance between dots in the horizontal direction D1, the cable longitudinal direction, increases by 20% or more due to the increase of the flow in the continuous manufacturing process (however, the distance between dots in the vertical direction orthogonal to the horizontal direction is kept constant), the recognition rate drops to less than 25%. When the distance between dots in the horizontal direction D1 by 15% to 19% (however, the distance between dots in the vertical direction D2 orthogonal to the horizontal direction D1 is constant), the recognition rate drops to less than 50%. Therefore, to control the recognition rate, it is necessary to properly design the speed at which the cable passes and the printing speed of the dot pattern in the continuous cable manufacturing process.

The dot pattern refers to a dot group composed of individual dots in a square or rectangular shape, as shown in FIGS. 5 to 7.

The recognition rate refers to a percentage obtained by recognizing a dot pattern printed on the cable surface by executing the platform using the manufacturer terminal, distributor/installer terminal or user terminal; reading the information contained in the dot pattern; and associating the information to the manufacturer controller, distributor/installer controller, or user controller.

Therefore, the dot pattern printed on the surface of the cable 400 should be set appropriately considering the relationship between the cable diameter and the number of dots disposed in the vertical direction. Thus, to maintain the dot spacing in the horizontal direction, it is necessary to control the cable proceeding speed according to a printing speed.

Figure 9:
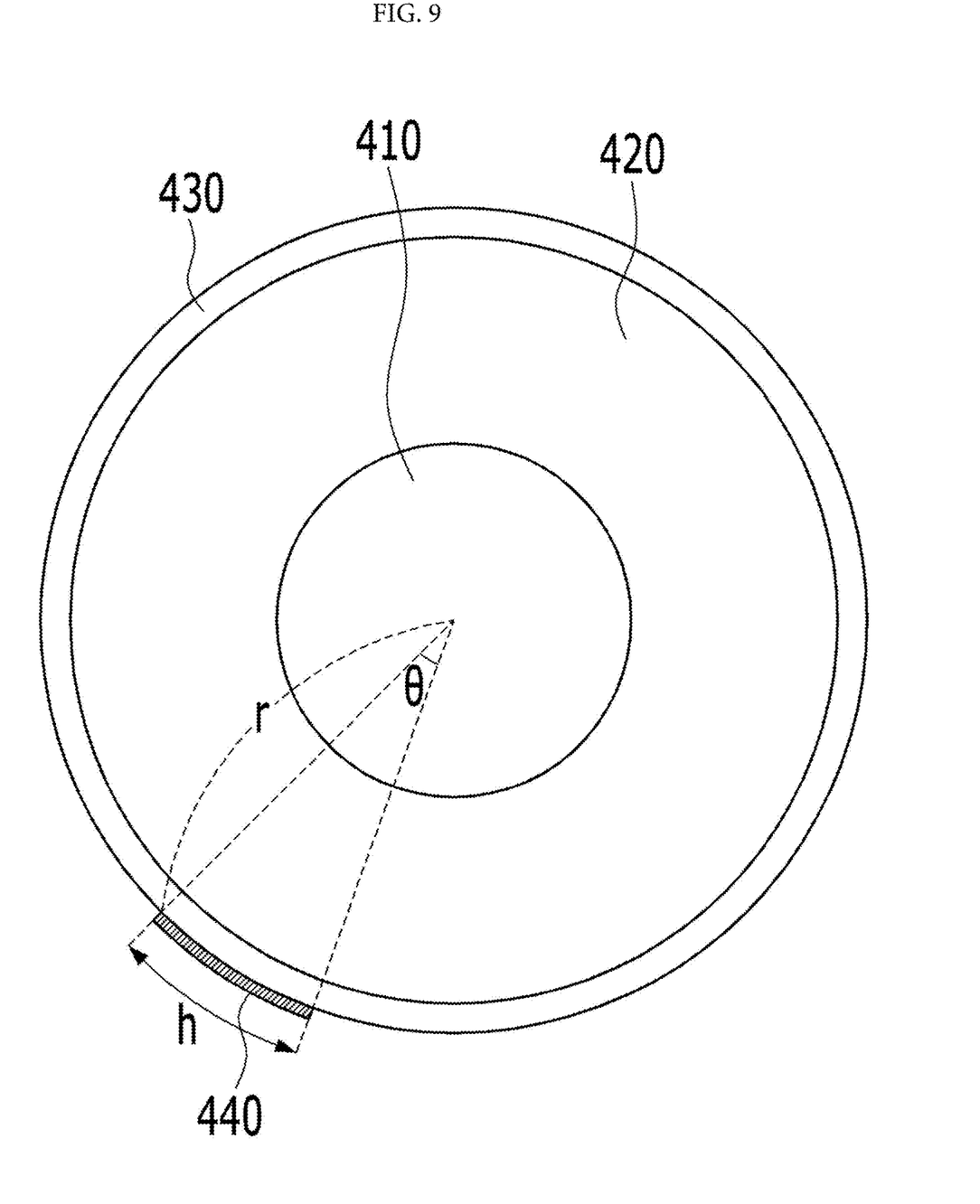
FIG. 9 is a cross-sectional view of a cable in a cable management system according to one embodiment of the present disclosure.

FIG. 9 is a cross-sectional view of a cable in a cable management system according to one embodiment of the present disclosure.

Referring to FIGS. 8 and 9, the cable 400 according to a cable management system according to one embodiment of the present disclosure may include a conductive layer 410, an insulating layer 420, a sheath layer 430, and a pattern 440 corresponding to a binary code.

Since the cable 400 has a circular cross-section, the length in the vertical direction D2 of the pattern 440 corresponding to the binary code provided on the sheath layer 430 of the cable 400 may be expressed by the arc length h in the cross-sectional view. The length in the vertical direction D2 occupied by the pattern 440 corresponding to the binary code may determine the central angle θ in the cross-sectional view of the cable 400. Accordingly, the length in the vertical direction D2 of the pattern 440 corresponding to the binary code may have a different value according to the radius r and the central angle θ of the cable.

Suppose a pattern corresponding to a binary code is printed too wide in the vertical direction D2. Then, a related process flow may slow down in the continuous cable manufacturing process, which may affect productivity and cause a problem that the pattern is not scanned correctly due to the curved surface of the cable. Also, when the pattern is printed so that its width is too short in the vertical direction D2, a problem may occur that the recognition rate degrades.

At this time, when the central angle θ is less than 5 degrees, scan recognition is not possible. Similarly, when the central angle exceeds 15 degrees, a problem may occur that the continuous manufacturing process flow slows down. Therefore, the vertical length D2 of the pattern 440 corresponding to the binary code may be expressed by arc length h having a central angle of 5 degrees or more and 15 degrees or less in the cross-sectional view of the cable 400.

The magnitude of the central angle occupied by a pattern corresponding to a binary code of a cable according to an embodiment of the present disclosure in the cross-sectional view of the cable and the corresponding continuous manufacturing process flow of the cable may have the values shown in Table 1 below.

TABLE 1

| Central angle in the cross-sectional view of the cable 400 | Continuous manufacturing process flow of the cable |
| --- | --- |
| 5-15 degrees | 20-50 mpm |
| 16-32 degrees | 1-19 mpm |

Also, when the arc length h is less than 4 mm regardless of the radius r of the cable 400, scan recognition by a terminal is impossible. In other words, a terminal may recognize a pattern corresponding to a binary code only when the vertical length D2 of the pattern corresponding to the binary code is at least 4 mm. Accordingly, the arc length h expressed by the pattern 440 corresponding to the binary code in the cross-sectional view of the cable may have a length of 4 mm or more and a length less than or equal to the value defined by Eq. 1 below.

$$h = 2\pi r \times 15/360.$$  Eq. 1

(In Eq. 1, h represents the arc length, and r represents the radius of a cable in the cross-sectional view.)

At this time, the arc length and the radius of the cable may be expressed in mm units. However, the present disclosure is not limited to the specific unit, and depending on the cable size, a different unit smaller or larger than mm may also be used.

As shown in FIG. 8, the pattern 440 corresponding to a binary code may include a first sub-pattern 440-1, a second sub-pattern 440-2, and a third sub-pattern 440-3 in the horizontal direction.

The first sub-pattern 440-1, the second sub-pattern 440-2, and the third sub-pattern 440-3 may all be formed in a pattern corresponding to a binary code containing the same data and may be formed in the same pattern. In other words, the first sub-pattern 440-1, the second sub-pattern 440-2, and the third sub-pattern 440-3 have the same shape and may include the same data. The pattern corresponding to the binary code may be printed on the sheath layer of the cable, and the printed pattern may be damaged or partially erased during cable distribution or installation. In this case, since recognition may not be possible, identical patterns are printed many times, as shown in FIG. 8 so that the patterns may be recognized even when the patterns are damaged. At this time, the patterns 440-1, 440-2, and 440-3 corresponding to a binary code may be formed so that the ratio of the vertical width D2 to the horizontal width D1 ranges from 1:2 to 1:4.

Figure 10:
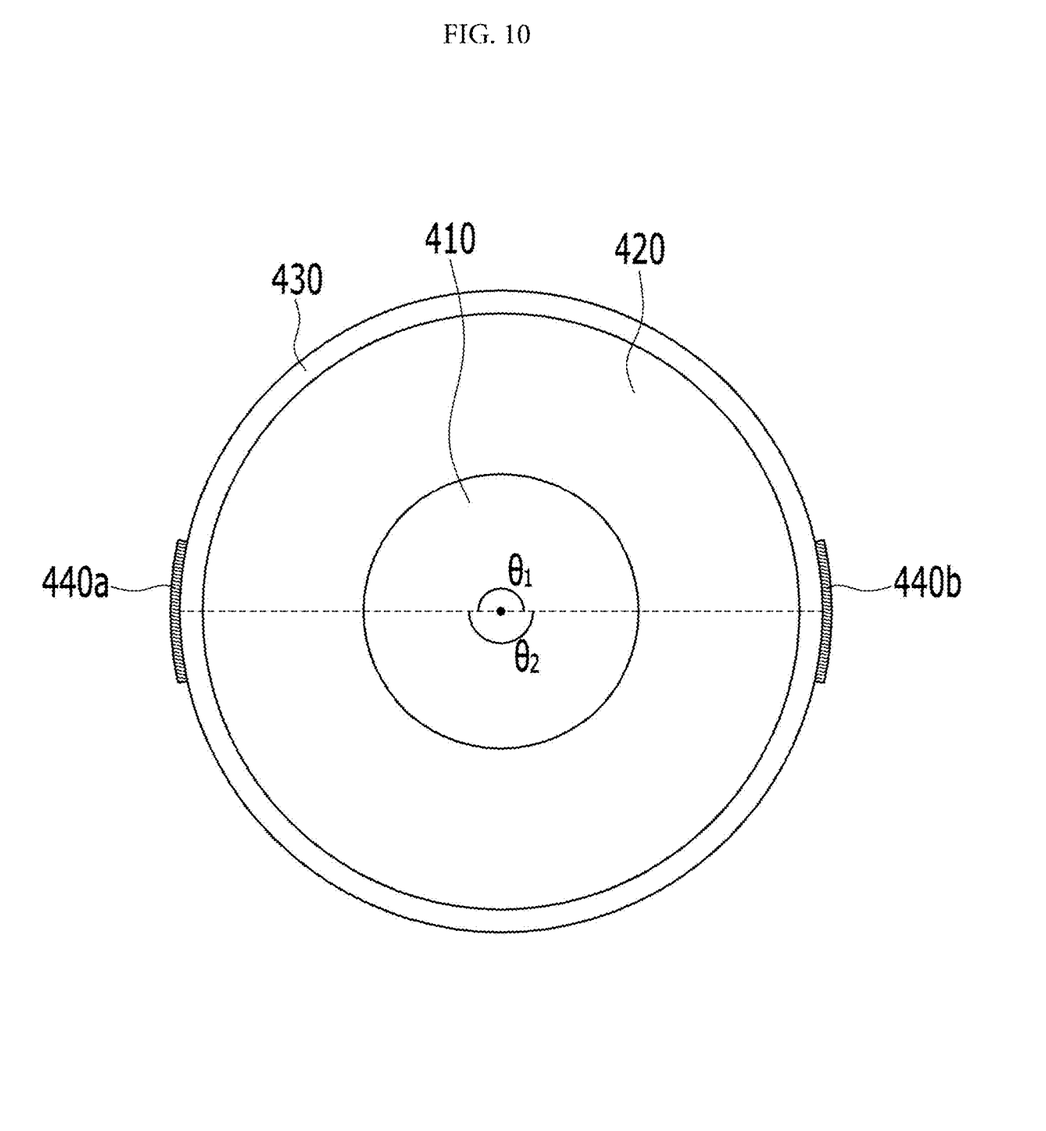
FIG. 10 is a cross-sectional view of a cable in a cable management system according to one embodiment of the present disclosure.

FIG. 10 is a cross-sectional view of a cable in a cable management system according to one embodiment of the present disclosure.

Referring to FIG. 10, a plurality of patterns corresponding to the binary code provided on the sheath layer of a cable in a cable management system according to an embodiment of the present disclosure may be provided. When a cable is installed, part of the cable may be buried in the ground or disposed to contact a facility such as a wall. In this case, when the printed portion of a pattern corresponding to the binary code is buried in the ground or disposed to contact a facility, the pattern corresponding to the binary code is not exposed and may not be recognized. Accordingly, to solve the problem that a pattern corresponding to a binary code is unrecognizable because the pattern is not exposed, a plurality of patterns corresponding to the binary code may be printed on the sheath layer of the cable. In this case, the central angles formed by the provided patterns corresponding to the binary code in the cross-sectional view may be the same.

For example, the central angles $\theta_1$ and $\theta_2$ formed by the first pattern 440a and the second pattern 440b in the cross-sectional view may be the same. In FIG. 10, central angles $\theta_1$ and $\theta_2$ formed by the first pattern 440a and the second pattern 440b in the cross-sectional view may be equal to 180 degrees.

Figure 11:
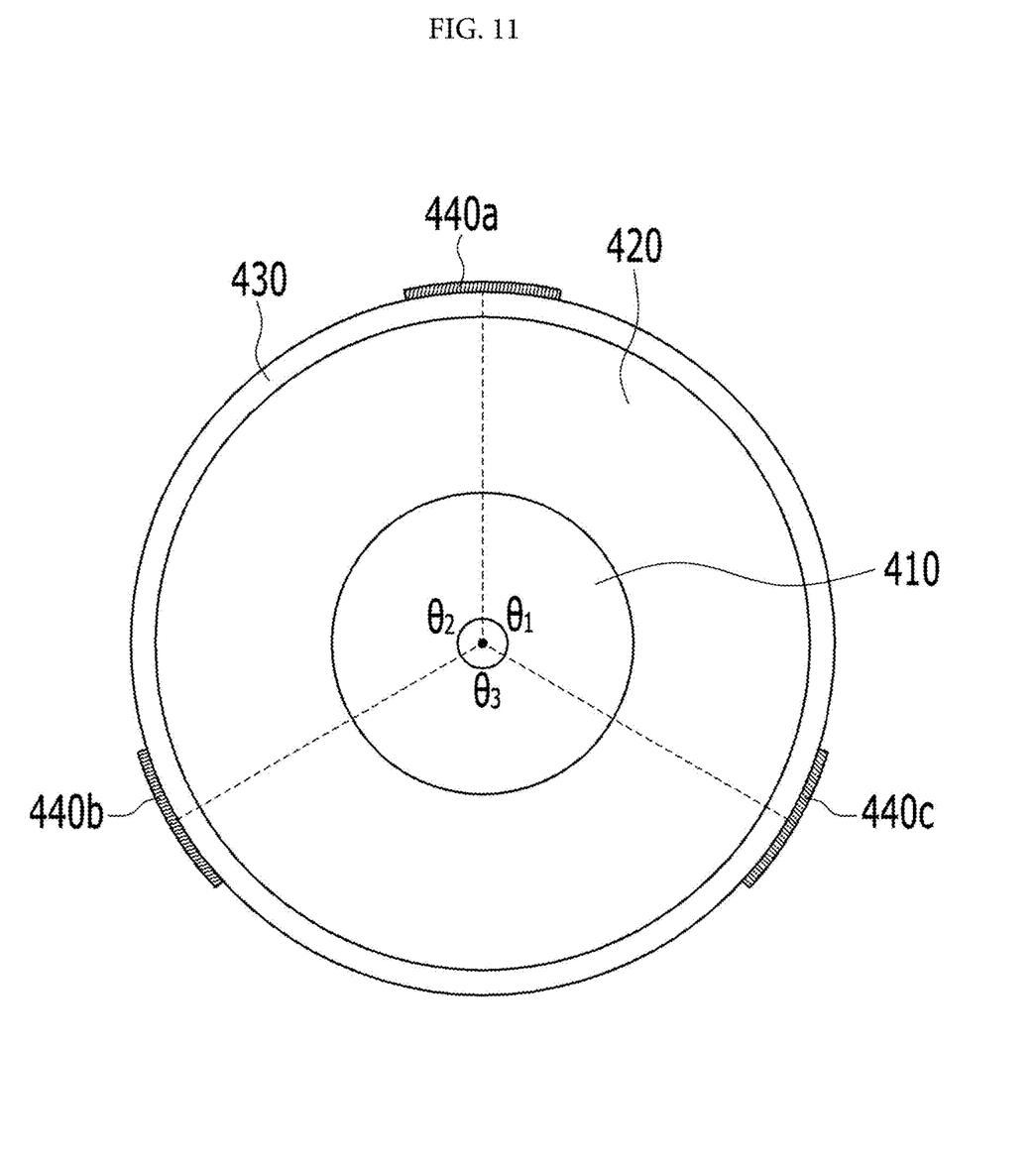
FIG. 11 is a cross-sectional view of a cable in a cable management system according to one embodiment of the present disclosure.

FIG. 11 is a cross-sectional view of a cable in a cable management system according to one embodiment of the present disclosure.

Referring to FIG. 11, a plurality of patterns corresponding to the binary code provided on the sheath layer of a cable in a cable management system according to an embodiment of the present disclosure may be provided. When a cable is installed, part of the cable may be buried in the ground or disposed to contact a facility such as a wall. In this case, when the printed portion of a pattern corresponding to the binary code is buried in the ground or disposed to contact a facility, the pattern corresponding to the binary code is not exposed and may not be recognized. Accordingly, to solve the problem that a pattern corresponding to a binary code is unrecognizable because the pattern is not exposed, a plurality of patterns corresponding to the binary code may be printed on the sheath layer of the cable. In this case, the central angles formed by the provided patterns corresponding to the binary code in the cross-sectional view may be the same.

For example, the central angles $\theta_1$, $\theta_2$ and $\theta_3$ formed by the first pattern 440a, the second pattern 440b, and the third pattern 440c in the cross-sectional view may be the same. In FIG. 11, central angles $\theta_1$, $\theta_2$ and $\theta_3$ formed by the first pattern 440a, the second pattern 440b, and the third pattern 440c in the cross-sectional view may be equal to 120 degrees.

Although the present disclosure has been described with reference to preferred embodiments given above, it should be understood by those skilled in the art that various modifications and variations of the present disclosure may be made without departing from the technical principles and scope specified by the appended claims below.

What is claimed is:

1. A cable comprising:
   a cable core; and
   a cable sheath layer formed on an outside of the cable core, wherein the cable sheath layer has, on an outer surface thereof, a pattern corresponding to a binary code, wherein a length of the pattern corresponding to the binary code in a vertical direction is expressed as a length of a circular arc in a cross-sectional view, and a magnitude of a central angle corresponding to the length of the circular arc ranges from 5 degrees to 15 degrees.

2. The cable of claim 1, wherein the cable core includes a conductive layer and an insulating layer surrounding the conductive layer.

3. The cable of claim 1, wherein a plurality of patterns corresponding to the binary code are provided, and central angles formed by each pattern of the plurality of patterns corresponding to the binary code in a cross-sectional view are the same.

4. The cable of claim 1, wherein the length of the circular arc is longer than 4 millimeters (mm) and shorter than a length defined by the following equation, in which h represents the length of the circular arc and r represents a radius of the cable in the cross-sectional view:

$$h=2\pi r \times 15/360.$$

5. The cable of claim 1, wherein a ratio of a width of the pattern corresponding to the binary code in a vertical direction to a width of the pattern corresponding to the binary code in a horizontal direction is between 1:2 to 1:4.

6. A cable, comprising:
   a cable core; and
   a cable sheath layer formed on an outside of the cable core, wherein the cable sheath layer has, on an outer surface thereof, a pattern corresponding to a binary code, wherein a length of the pattern corresponding to the binary code in the vertical direction is expressed as a length of a circular arc in a cross-sectional view, and the length of the circular arc is longer than 4 millimeters (mm) and shorter than a length defined by the following equation, in which h represents the length of the circular arc and r represents a radius of the cable in the cross-sectional view:

$$h=2\pi r \times 15/360.$$

7. The cable of claim 6, wherein the cable core includes a conductive layer and an insulating layer surrounding the conductive layer.

8. The cable of claim 6, wherein a plurality of patterns corresponding to the binary code are provided, and central angles formed by each pattern of the plurality of patterns corresponding to the binary code in a cross-sectional view are the same.

9. The cable of claim 6, wherein a magnitude of a central angle corresponding to the length of the circular arc ranges from 5 degrees to 15 degrees.

10. The cable of claim 6, wherein a ratio of a width of the pattern corresponding to the binary code in a vertical direction to a width of the pattern corresponding to the binary code in a horizontal direction is between 1:2 to 1:4.

* * * * *